(12) United States Patent
Hsu et al.

(10) Patent No.: US 10,131,733 B2
(45) Date of Patent: Nov. 20, 2018

(54) CATALYST COMPOSITION, METHOD FOR HYDROGENATING STYRENIC BLOCK COPOLYMERS, AND HYDROGENATED POLYMER

(71) Applicant: TSRC CORPORATION, Taipei (TW)

(72) Inventors: Chih-Wei Hsu, Taipei (TW); Man-Yin Lo, Taipei (TW); Yin-Chieh Chen, Taipei (TW)

(73) Assignee: TSRC CORPORATION, Taipei (TW)

( * ) Notice: Subject to any disclaimer, the term of this patent is extended or adjusted under 35 U.S.C. 154(b) by 0 days.

(21) Appl. No.: 14/092,995

(22) Filed: Nov. 28, 2013

(65) Prior Publication Data

US 2015/0094423 A1    Apr. 2, 2015

(30) Foreign Application Priority Data

Sep. 30, 2013  (TW) .............................. 102135281 A

(51) Int. Cl.

| | | |
|---|---|---|
| *B01J 21/06* | (2006.01) | |
| *B01J 23/656* | (2006.01) | |
| *B01J 27/187* | (2006.01) | |
| *C08F 293/00* | (2006.01) | |
| *C08F 8/04* | (2006.01) | |

(52) U.S. Cl.
CPC ........... *C08F 293/00* (2013.01); *B01J 21/063* (2013.01); *B01J 23/6567* (2013.01); *B01J 27/187* (2013.01); *C08F 8/04* (2013.01)

(58) Field of Classification Search
CPC .... B01J 21/063; B01J 27/187; B01J 23/6567; C08F 8/04
See application file for complete search history.

(56) References Cited

U.S. PATENT DOCUMENTS

2005/0121364 A1*  6/2005  Tanev ........................... 208/138
2012/0091038 A1    4/2012  Lacombe et al.

* cited by examiner

*Primary Examiner* — Jeffrey C Mullis
(74) *Attorney, Agent, or Firm* — Pai Patent & Trademark Law Firm; Chao-Chang David Pai

(57) ABSTRACT

A catalyst composition, a method for hydrogenating styrenic block copolymer employing the same, and a hydrogenated polymer from the method are provided. The method for hydrogenating styrenic block copolymer includes subjecting a hydrogenation process to a styrenic block copolymer in the presence of a catalyst composition. In particular, the catalyst composition includes an oxide carrier, and a catalyst disposed on the oxide carrier, wherein the catalyst includes a platinum-and-rhenium containing phosphorus compound.

8 Claims, 1 Drawing Sheet

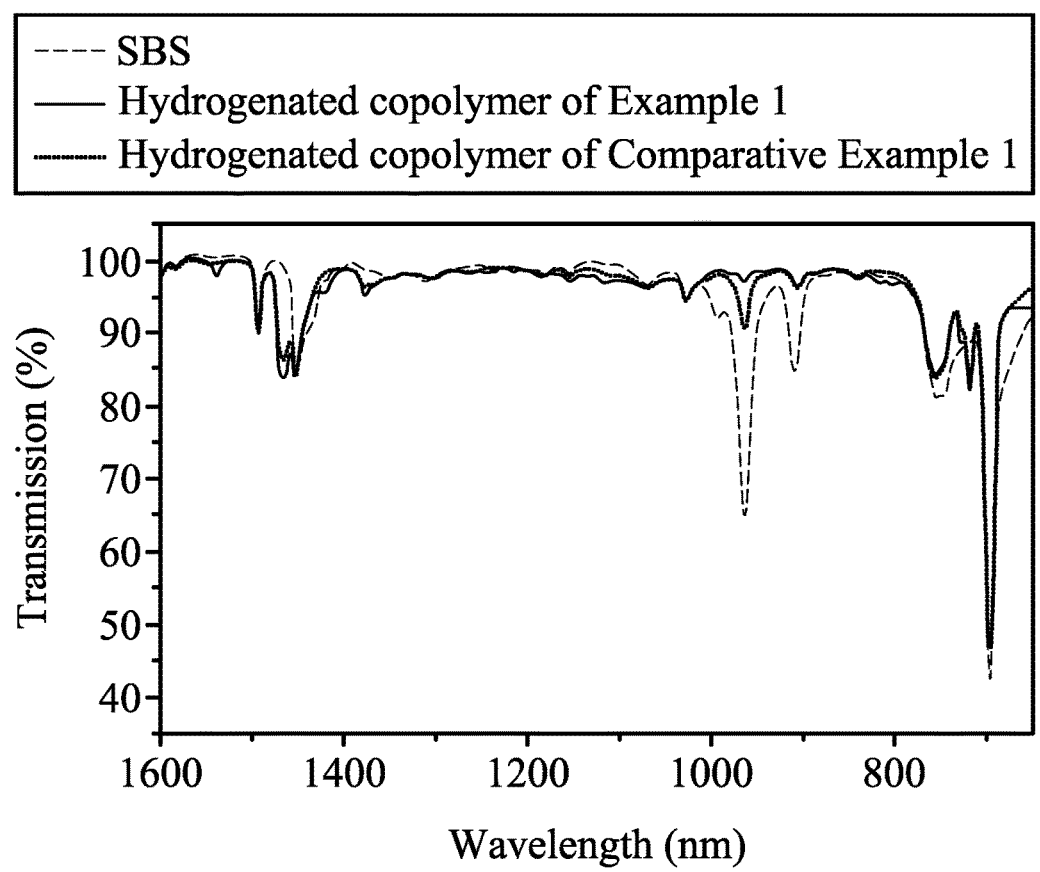

CATALYST COMPOSITION, METHOD FOR HYDROGENATING STYRENIC BLOCK COPOLYMERS, AND HYDROGENATED POLYMER

CROSS REFERENCE TO RELATED APPLICATIONS

This application is based upon and claims the benefit of priority from prior Taiwan Patent Application No. 102135281, filed on Sep. 30, 2013, the entire contents of which are incorporated herein by reference.

BACKGROUND

Technical Field

The technical field relates to a catalyst composition for hydrogenating copolymer.

Related Art

In the industries, the conjugated diene monomers and the vinyl aromatic hydrocarbon monomers are subjected to a copolymerization to form styrenic block copolymers with unsaturated alkenyl double bonds in most cases. Due to the existence of a large amount of these unsaturated alkenyl double bonds, the styrenic block copolymers exhibits poor performances in terms of weather resistance, heat resistance and anti-oxidation. These conditions become severe for those copolymers, which are formed by copolymerizing the conjugated diene monomers and the vinyl aromatic hydrocarbon monomers. Therefore, those copolymers find limited application as outdoor materials.

For the copolymers formed by copolymerizing the conjugated diene monomers and the vinyl aromatic hydrocarbon monomers, the drawbacks of poor performances of weather resistance, heat resistance and anti-oxidation can be improved via a partially hydrogenation.

A lot of catalyst compositions have been used for hydrogenating unsaturated alkenyl double bonds of the aforementioned copolymer, however the hydrogenation conversion of the unsaturated alkenyl double bonds of the vinyl aromatic hydrocarbon block of the copolymer cannot be easily controlled during the hydrogenation employing the conventional catalyst compositions.

Accordingly, a novel catalyst and method, with high reactivity, for effectively controlling the hydrogenation conversion of the unsaturated alkenyl double bonds of the vinyl aromatic hydrocarbon block of the copolymer are called for.

SUMMARY

An embodiment of the disclosure provides a catalyst composition for hydrogenating a styrenic block copolymer. The catalyst composition includes an oxide carrier and a catalyst disposed on the oxide carrier. Particularly, the catalyst includes a platinum-and-rhenium containing phosphorus compound.

According to some embodiments of the disclosure, a method for hydrogenating styrenic block copolymer is provided. The method includes subjecting a styrenic block copolymer to a hydrogenation process in the presence of the catalyst composition, wherein the catalyst composition comprises an oxide carrier, and a catalyst disposed on the oxide carrier, and wherein the catalyst comprises a platinum-and-rhenium containing phosphorus compound.

According to some embodiments of the disclosure, a hydrogenated polymer is provided. The hydrogenated polymer includes a product fabricated by the following steps: subjecting a styrenic block copolymer to a hydrogenation process in the presence of the catalyst composition, obtaining the hydrogenated polymer. In particular, the catalyst composition includes an oxide carrier, and a catalyst disposed on the oxide carrier, wherein the catalyst include platinum-and-rhenium containing phosphorus compound.

A detailed description is given in the following embodiments with reference to the accompanying drawing.

BRIEF DESCRIPTION OF THE DRAWINGS

The disclosure can be more fully understood by reading the subsequent detailed description and examples with references made to the accompanying drawings, wherein:

The FIGURE shows infrared spectra of the styrene-butadiene-styrene (SBS) copolymers of Example 1 and comparative Example 1 before and after the hydrogenation process.

DETAILED DESCRIPTION

An embodiment of the disclosure provides a catalyst composition, and the catalyst composition can be used in a non-homogeneous catalyst system with high reactivity and hydrogenation selectivity, for hydrogenating a styrenic block copolymer. The catalyst composition includes: an oxide carrier; and, a catalyst disposed on the oxide carrier, wherein the catalyst includes platinum-and-rhenium containing phosphorus compound.

The oxide carrier is preferably selected from the group consisting of titanium oxide, aluminum oxide, zirconium oxide, silicon oxide, or a combination thereof.

Preferably, the catalyst is present in an amount of between 0.5 and 9.0% by weight, based on the weight of the catalyst composition. In a preferred embodiment the weight ratio between the platinum and the rhenium in the catalyst is from 10:1 to 1:1 or from 5:1 to 1:1. According to a preferred embodiment, the amount of platinum exceeds the amount of rhenium in the catalyst on a weight basis.

The method for preparing the catalyst composition includes the following steps. First, a platinum-containing compound (such as chloroplatinic acid ($H_2PtCl_6$)), and a rhenium-containing compound (such as perrhenic acid ($HReO_4$)) is mixed with an oxide carrier to obtain a mixture, wherein the oxide carrier can be titanium oxide, aluminum oxide, zirconium oxide, silicon oxide, or a combination thereof. Next, the mixture is dissolved in a solvent (such as DI water). After stirring, the pH value of the result is adjusted to 11-12, obtaining a first solution. Next, a hypophosphite ($NaH_2PO_2 \cdot H_2O$) is dissolved in a DI water, and the pH value of the result is adjusted to 11-12, obtaining a second solution. Next, the first solution is mixed with the second solution to obtain a solution, and the pH value of the result is maintained at 11-12. After stirring, the solution is heated at 90° C. for 10-20 hrs. Finally, the result is filtrated and the precipitate is collected. After drying the precipitate at 100~105° C., the catalyst composition (i.e. platinum-and-rhenium containing phosphorus compound disposed on oxide carrier), wherein the weight ratio between the platinum and rhenium in the catalyst is from 10:1 to 1:1 or from 5:1 to 1:1. In another embodiment of the disclosure, the catalyst has a weight percentage of between 0.5 wt % and 9 wt %, based on the weight of the catalyst composition.

According to embodiments of the disclosure, the disclosure provides a method for hydrogenating styrenic block copolymer with the aforementioned catalyst composition. The method includes: subjecting styrenic block copolymer to a hydrogenation process in the presence of the catalyst composition of this disclosure. The styrenic block copolymer can be prepared by polymerizing a conjugated diene monomer with a vinyl aromatic hydrocarbon monomer, wherein the conjugated diene monomer can include 1,3-butadiene, 2,3-dimethyl-1,3-butadiene, 3-butyl-1,3-octadiene, isoprene, 1-methylbutadiene, 2-phenyl-1,3-butadiene, or a combinations thereof. The vinyl aromatic hydrocarbon monomer can include styrene, methylstyrene (or an isomer thereof), ethylstyrene (or an isomer thereof), cyclohexylstyrene, vinyl biphenyl, 1-vinyl-5-hexyl naphthalene, vinyl naphthalene, vinyl anthracene, or combinations thereof. For example, the styrenic block copolymer can be styrene-butadiene-styrene triblock copolymer (SBS), styrene-isoprene-styrene triblock copolymer (SIS), styrene-butadiene-styrene-butadiene-styrene pentablock copolymer (SBSBS), styrene-isoprene-styrene-isoprene-styrene pentablock copolymer (SISIS), or combinations thereof. The styrenic block copolymer has a weight average molecular weight (Mw) of between 5,000 and 400,000, such as between 5,000 and 300,000, or between 20,000 and 300,000. The weight average molecular weight of the copolymer can be obtained by calculating the data from the gel permeation chromatography (GPC). According to embodiments of the disclosure, the hydrogenation process has a reaction temperature of between 40° C. and 170° C. (such as between 60° C. and 170° C. or between 80° C. and 150° C.), and the hydrogenation process has a reaction pressure of between 10 Kg/cm$^2$ and 50 Kg/cm$^2$ (such as between 20 Kg/cm$^2$ and 50 Kg/cm$^2$, or between 30 Kg/cm$^2$ and 50 Kg/cm$^2$).

According to embodiments of the disclosure, the disclosure provides a hydrogenated polymer prepared from the aforementioned method for hydrogenating styrenic block copolymer. The hydrogenated polymer includes a product fabricated by subjecting a styrenic block copolymer to a hydrogenation process in the presence of the aforementioned catalyst composition.

It should be noted that, after the hydrogenation process, the hydrogenation conversion of the non-aromatic double bonds of the styrenic block copolymer is measured to reach 85% or above, resulting in that the non-aromatic double bonds are converted to a single bonds. On the other hand, the hydrogenation conversion (between 1% and 99.9%, for example) of the aromatic double bonds of the styrenic block copolymer can be optionally modified by means of the reaction conditions (such as reaction temperature, reaction period, or the weight ratio between the catalyst composition and styrenic block copolymer) of the hydrogenation process.

Accordingly, after the hydrogenation process employing the catalyst composition of the disclosure, the hydrogenation conversion of the non-aromatic double bonds of the styrenic block copolymer is measured to reach 85% or above, and the hydrogenation conversion of the aromatic double bonds of the styrenic block copolymer is controlled to range between 1% and 99% (i.e. 1-10%, 10-20%, 20-30%, or 30-99.9% of the aromatic double bonds of the styrenic block copolymer can be converted to single bonds) in the meanwhile. Further, in one embodiment of the disclosure, all double bonds of the styrenic block copolymer can be converted to single bonds after the hydrogenation process in the presence of the catalyst composition of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Preparation of the Catalyst Composition

Preparation Example 1

First, 0.8181 g of chloroplatinic acid ($H_2PtCl_6$, manufactured and sold by Aldrich), 0.1814 g of perrhenic acid ($HReO_4$, manufactured and sold by Aldrich), and 28.595 g of titanium dioxide ($TiO_2$, manufactured and sold by Alfa Aesar) were mixed and dissolved in DI water (300 ml). After stirring for 1 hr, the mixture was subjected to the ultrasonic agitation for 0.5 hr. Next, the pH value of the above solution was adjusted to 11-12 by the addition of the NaOH solution, obtaining a first solution. Next, 0.2054 g of sodium hypophosphite ($NaH_2PO_2.H_2O$, manufactured and sold by SHOWA) was dissolved in DI water (150 ml), and the pH value of the above solution was adjusted to 11-12 by the addition of the NaOH solution, obtaining a second solution.

Next, the first solution was mixed with the second solution, and the pH value of the above mixture was adjusted to 11-12. After subjecting to the ultrasonic agitation for 10 mins, the mixture was heated under an argon atmosphere at 90° C. for 10 hrs. The result was filtered and the precipitate was collected. Finally, the precipitate was baked at 105° C. for several hrs, obtaining catalyst composition PtReP/$TiO_2$.

Selective Hydrogenation of SBS

Example 1

9 g of styrene-butadiene-styrene triblock copolymer (SBS) (with a weight average molecular weight of 100,000, the weight ratio between butadiene and styrene of 60:40) was dissolved in cyclohexane (120 g) to obtain a SBS solution with a solid content of 7.5 wt %. Next, the SBS solution was disposed into a hydrogenation tank under an argon atmosphere. Next, the catalyst composition PtReP/$TiO_2$ (0.6 g) of Preparation Example 1 was added into the hydrogenation tank, and then the hydrogenation tank was sealed and the hydrogen gas was introduced into the tank (with a pressure of 40 Kg/cm$^2$). After heating the hydrogenation tank to 100° C., the hydrogenation conversion (transforming the double bonds into the single bonds) of the butadiene block and the styrene block were determined by $H^1$-NMR and FT-IR. The measurement of the hydrogenation conversion included dissolving the determine and into d-chloroform ($CDCl_3$), measuring the integrated area of absorption peak of the double bonds and aromatic ring before and after the hydrogenation, and determining the hydrogenation conversion by means of the decreased integrated area.

The hydrogenation process had a reaction period of 28.8 mins, when the hydrogenation conversion of the non-aromatic double bonds of the styrenic block copolymer was measured to reach 99%. Simultaneously, the hydrogenation conversion of the aromatic double bonds of the styrenic block copolymer was measured to be less than 10%. The reaction conditions and results were shown in Table 1.

Comparative Example 1

The process for Comparative Example 1 was performed as Example 1 except for the substitution of the catalyst composition PtReP/SiO$_2$ (platinum-rhenium alloy carried in SiO$_2$ with a weight ratio between PtRe and SiO$_2$ was 4.5:95.5) for the catalyst composition PtReP/TiO$_2$ of Preparation Example 1.

After heating the hydrogenation tank to 100° C., the hydrogenation conversion (transforming the double bonds into the single bonds) of the butadiene block and the styrene block can be determined by H$^1$-NMR and FT-IR.

The hydrogenation process had a reaction period of 49.8 mins, when the hydrogenation conversion of the non-aromatic double bonds of the styrenic block copolymer was measured to reach 98%. Simultaneously, the hydrogenation conversion of the aromatic double bonds of the styrenic block copolymer was measured to be less than 10%. The reaction conditions and results were shown in Table 1.

995 cm$^{-1}$, and 912 cm$^{-1}$ of the infrared spectrum of the hydrogenated block copolymers of Example 1, which indicates that double bonds of the polybutadienes block are mostly hydrogenated.

Example 2

14.64 g of styrene-butadiene-styrene triblock copolymer (SBS) (with a weight average molecular weight of 73,000, the weight ratio between butadiene and styrene of 71:29) was dissolved in cyclohexane (120 g) to obtain a SBS solution with a solid content of 12.2 wt %. Next, the SBS solution was disposed into a hydrogenation tank under an argon atmosphere. Next, the catalyst composition PtReP/TiO$_2$ (0.97 g) of Preparation Example 1 was added into the hydrogenation tank, and then the hydrogenation tank was sealed and the hydrogen gas was introduced into the tank (with a pressure of 40 Kg/cm$^2$). After heating the hydrogenation tank to 100° C. for 22.8 mins, a hydrogenated block copolymer was obtained.

Next, the hydrogenation conversion of the butadiene block (non-aromatic double bonds) and the styrene block (aromatic double bonds) of the hydrogenated block copolymer were determined by H$^1$-NMR and FT-IR, and the reaction conditions and results are shown in Table 2.

Example 3

14.64 g of styrene-butadiene-styrene triblock copolymer (SBS) (with a weight average molecular weight of 73,000,

TABLE 1

| | catalyst composition | hydrogen pressure (Kg/cm$^2$) | temperature (° C.) | reaction period (mins) | hydrogenation conversion of the non-aromatic double bonds | hydrogenation conversion of the aromatic double bonds |
|---|---|---|---|---|---|---|
| Example 1 | PtReP/ TiO$_2$ | 40 | 100 | 28.8 | >99% | <10% |
| Comparative Example 1 | PtRe/SiO$_2$ | 40 | 100 | 49.8 | 98% | <10% |

As shown in Table 1, in comparison with the catalyst composition including platinum-rhenium alloy, the catalyst composition including the platinum-and-rhenium containing phosphorus compound of the disclosure exhibits higher reactivity and enhances the hydrogenation efficiency (increasing about 1.42 times).

The FIGURE shows the infrared spectra of the styrene-butadiene-styrene (SBS) copolymers of Example 1 and comparative Example 1 measured by Fourier Transform IR (FT-IR) spectrometer before and after the hydrogenation process. As shown in the FIGURE, the styrene-butadiene-styrene (SBS) copolymers have peaks at 968 cm$^{-1}$ and 995 cm$^{-1}$ (representing the trans double bonds), and peaks at 912 cm$^{-1}$ (representing the 1,2-vinyl double bonds) before the hydrogenation process. As shown in the FIGURE, the hydrogenated block copolymers of Comparative Example 1 give an unapparent absorption peaks for trans- and vinyl double bonds (the peaks at 968 cm$^{-1}$, 995 cm$^{-1}$, and 912 cm$^{-1}$ with lower intensity) after the hydrogenation process. On the other hand, there are essentially no peaks t 968 cm$^{-1}$, the weight ratio between butadiene and styrene of 71:29) was dissolved in cyclohexane (120 g) to obtain a SBS solution with a solid content of 12.2 wt %. Next, the SBS solution was disposed into a hydrogenation tank under an argon atmosphere. Next, the catalyst composition PtReP/TiO$_2$ (0.97 g) of Preparation Example 1 was added into the hydrogenation tank, and then the hydrogenation tank was sealed and the hydrogen gas was introduced into the tank (with a pressure of 40 Kg/cm$^2$). After heating the hydrogenation tank to 88° C. for 33.6 mins, a hydrogenated block copolymer was obtained.

Next, the hydrogenation conversion of the butadiene block (non-aromatic double bonds) and the styrene block (aromatic double bonds) of the hydrogenated block copolymer were determined by H$^1$-NMR and FT-IR, and the reaction conditions and results are shown in Table 2.

Example 4

14.64 g of styrene-butadiene-styrene triblock copolymer (SBS) (with a weight average molecular weight of 73,000, the weight ratio between butadiene and styrene of 71:29) was dissolved in cyclohexane (120 g) to obtain a SBS solution with a solid content of 12.2 wt %. Next, the SBS solution was disposed into a hydrogenation tank under an argon atmosphere. Next, the catalyst composition PtReP/TiO$_2$ (0.97 g) of Preparation Example 1 was added into the hydrogenation tank, and then the hydrogenation tank was sealed and the hydrogen gas was introduced into the tank (with a pressure of 40 Kg/cm$^2$). After heating the hydrogenation tank to 60° C. for 36.6 mins, a hydrogenated block copolymer was obtained.

Next, the hydrogenation conversion of the butadiene block (non-aromatic double bonds) and the styrene block (aromatic double bonds) of the hydrogenated block copolymer were determined by H$^1$-NMR and FT-IR, and the reaction conditions and results are shown in Table 2.

Example 5

14.16 g of styrene-butadiene-styrene triblock copolymer (SBS) (with a weight average molecular weight of 73,000, the weight ratio between butadiene and styrene of 71:29) was dissolved in cyclohexane (120 g) to obtain a SBS solution with a solid content of 11.8 wt %. Next, the SBS solution was disposed into a hydrogenation tank under an argon atmosphere. Next, the catalyst composition PtReP/TiO$_2$ (0.94 g) of Preparation Example 1 was added into the hydrogenation tank, and then the hydrogenation tank was sealed and the hydrogen gas was introduced into the tank (with a pressure of 40 Kg/cm$^2$). After heating the hydrogenation tank to 170° C. for 156 mins, a hydrogenated block copolymer was obtained.

Next, the hydrogenation conversion of the butadiene block (non-aromatic double bonds) and the styrene block (aromatic double bonds) of the hydrogenated block copolymer were determined by H$^1$-NMR and FT-IR, and the reaction conditions and results are shown in Table 2.

Example 6

18 g of styrene-butadiene-styrene triblock copolymer (SBS) (with a weight average molecular weight of 73,000, the weight ratio between butadiene and styrene of 71:29) was dissolved in cyclohexane (102 g) to obtain a SBS solution with a solid content of 17.6 wt %. Next, the SBS solution was disposed into a hydrogenation tank under an argon atmosphere. Next, the catalyst composition PtReP/TiO$_2$ (1.2 g) of Preparation Example 1 was added into the hydrogenation tank, and then the hydrogenation tank was sealed and the hydrogen gas was introduced into the tank (with a pressure of 40 Kg/cm$^2$). After heating the hydrogenation tank to 170° C. for 120 mins, a hydrogenated block copolymer was obtained.

Next, the hydrogenation conversion of the butadiene block (non-aromatic double bonds) and the styrene block (aromatic double bonds) of the hydrogenated block copolymer were determined by H$^1$-NMR and FT-IR, and the reaction conditions and results are shown in Table 2.

Example 7

18 g of styrene-butadiene-styrene triblock copolymer (SBS) (with a weight average molecular weight of 265,000, the weight ratio between butadiene and styrene of 68:32) was dissolved in cyclohexane (102 g) to obtain a SBS solution with a solid content of 17.6 wt %. Next, the SBS solution was disposed into a hydrogenation tank under an argon atmosphere. Next, the catalyst composition PtReP/TiO$_2$ (1.2 g) of Preparation Example 1 was added into the hydrogenation tank, and then the hydrogenation tank was sealed and the hydrogen gas was introduced into the tank (with a pressure of 40 Kg/cm$^2$). After heating the hydrogenation tank to 170° C. for 240 mins, a hydrogenated block copolymer was obtained.

Next, the hydrogenation conversion of the butadiene block (non-aromatic double bonds) and the styrene block (aromatic double bonds) of the hydrogenated block copolymer were determined by H$^1$-NMR and FT-IR, and the reaction conditions and results are shown in Table 2.

TABLE 2

|  | catalyst composition | molecular weight | temperature (° C.) | reaction period (mins) | hydrogenation conversion of the non-aromatic double bonds | hydrogenation conversion of the aromatic double bonds |
|---|---|---|---|---|---|---|
| Example 2 | PtReP/TiO$_2$ | 73,000 | 100 | 22.8 | >99% | 29.3% |
| Example 3 | PtReP/TiO$_2$ | 73,000 | 88 | 33.6 | >99% | 20.4% |
| Example 4 | PtReP/TiO$_2$ | 73,000 | 60 | 36.6 | >99% | 12.3% |
| Example 5 | PtReP/TiO$_2$ | 73,000 | 170 | 156 | >99% | >99% |
| Example 6 | PtReP/TiO$_2$ | 73,000 | 170 | 120 | 96% | 73% |
| Example 7 | PtReP/TiO$_2$ | 265,000 | 170 | 240 | 94% | 53% |

As shown in Table 2, the hydrogenation conversion of the aromatic double bonds can be reduced by decreasing the reaction temperature (or decreasing the reaction period), under the same other reaction conditions. On the other hand, the hydrogenation conversion of the aromatic double bonds can be increased by increasing the reaction temperature (or increasing the reaction period), under the same other reaction conditions.

Furthermore, the hydrogenation conversion of the aromatic double bonds can be decreased by increasing the molecular weight of the styrene-butadiene-styrene triblock copolymer (SBS), under the same other reaction conditions. Accordingly, in the method for hydrogenating styrenic block copolymer employing the catalyst composition of the disclosure, the hydrogenation conversion of the styrene block (the hydrogenation conversion of the aromatic double bonds) and the hydrogenation conversion of the butadiene block (the hydrogenation conversion of non-aromatic double bonds) can be controlled by modifying the reaction conditions of the hydrogenation process (such as reaction period or temperature).

Selective Hydrogenation of SIS

Example 8

18 g of styrene-isoprene-styrene triblock copolymer (SIS) (with a weight average molecular weight of 120,000, the weight ratio between isoprene and styrene of 70:30) was dissolved in cyclohexane (102 g) to obtain a SIS solution with a solid content of 17.6 wt %. Next, the SIS solution was disposed into a hydrogenation tank under an argon atmosphere. Next, the catalyst composition PtReP/TiO$_2$ (1.2 g) of Preparation Example 1 was added into the hydrogenation tank, and then the hydrogenation tank was sealed and the hydrogen gas was introduced into the tank (with a pressure of 40 Kg/cm$^2$). After heating the hydrogenation tank to 170° C. for 240 mins, a hydrogenated block copolymer was obtained.

Next, the hydrogenation conversion of the isoprene block (non-aromatic double bonds) and the styrene block (aromatic double bonds) of the hydrogenated block copolymer were determined by H$^1$-NMR and FT-IR, and the reaction conditions and results were shown in Table 3.

Example 9

18 g of styrene-isoprene-styrene triblock copolymer (SIS) (with a weight average molecular weight of 120,000, the weight ratio between isoprene and styrene of 70:30) was dissolved in cyclohexane (102 g) to obtain a SIS solution with a solid content of 17.6 wt %. Next, the SIS solution was disposed into a hydrogenation tank under an argon atmosphere. Next, the catalyst composition PtReP/TiO$_2$ (1.2 g) of Preparation Example 1 was added into the hydrogenation tank, and then the hydrogenation tank was sealed and the hydrogen gas was introduced into the tank (with a pressure of 40 Kg/cm$^2$). After heating the hydrogenation tank to 170° C. for 360 mins, a hydrogenated block copolymer was obtained.

Next, the hydrogenation conversion of the isoprene block (non-aromatic double bonds) and the styrene block (aromatic double bonds) of the hydrogenated block copolymer were determined by H$^1$-NMR and FT-IR, and the reaction conditions and results were shown in Table 3.

TABLE 3

| | catalyst composition | hydrogen pressure (Kg/cm$^2$) | temperature (° C.) | reaction period (mins) | hydrogenation conversion of the non-aromatic double bonds | hydrogenation conversion of the aromatic double bonds |
|---|---|---|---|---|---|---|
| Example 8 | PtReP/TiO$_2$ | 40 | 170 | 240 | 95 | 94 |
| Example 9 | PtReP/TiO$_2$ | 40 | 170 | 360 | 98 | 97 |

As shown in Table 3, the catalyst composition of the disclosure can also be used in the hydrogenation process of the styrene-isoprene-styrene triblock copolymer (SIS) with a very high hydrogenation conversion of the styrene block (the hydrogenation conversion of the aromatic double bonds) and a very high hydrogenation conversion of the isoprene block (the hydrogenation conversion of the non-aromatic double bonds).

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A catalyst composition, for hydrogenating a styrenic block copolymer, comprising:
   an oxide carrier; and
   a catalyst disposed on the oxide carrier, wherein the catalyst consists of phosphorus, platinum and rhenium.

2. The catalyst composition as claimed in claim 1, wherein the oxide carrier comprises titanium oxide, aluminum oxide, zirconium oxide, silicon oxide, or a combination thereof.

3. The catalyst composition as claimed in claim 1, wherein the styrenic block copolymer is formed by polymerizing a conjugated diene monomer and a vinyl aromatic hydrocarbon monomer.

4. The catalyst composition as claimed in claim 3, wherein the conjugated diene monomer comprises 1,3-butadiene, 2,3-dimethyl-1,3-butadiene, 3-butyl-1,3-octadiene, isoprene, 1-methylbutadiene, 2-phenyl-1,3-butadiene, or a combinations thereof.

5. The catalyst composition as claimed in claim 3, wherein the vinyl aromatic hydrocarbon monomer comprises styrene, methylstyrene, ethylstyrene, cyclohexylstyrene, vinyl biphenyl, 1-vinyl-5-hexyl naphthalene, vinyl naphthalene, vinyl anthracene, or a combinations thereof.

6. The catalyst composition as claimed in claim 3, wherein the styrenic block copolymer comprises styrene-butadiene-styrene triblock copolymer, styrene-isoprene-styrene triblock copolymer, styrene-butadiene-styrene-butadiene-styrene pentablock copolymer, or styrene-isoprene-styrene-isoprene-styrene pentablock copolymer.

7. The catalyst composition as claimed in claim 1, wherein the catalyst has a weight percentage of between 0.5 wt % and 9.0 wt %, based on the weight of the catalyst composition.

8. The catalyst composition as claimed in claim 1, wherein the weight ratio between the platinum and rhenium in the catalyst is from 10:1 to 1:1.

* * * * *